123,296

UNITED STATES PATENT OFFICE.

CHRISTIAN L. SCHURR AND WILLIAM G. REHBEIN, OF BALTIMORE, MD.

IMPROVEMENT IN WELDING COPPER.

Specification forming part of Letters Patent No. 123,296, dated January 30, 1872.

SPECIFICATION.

*To all whom it may concern:*

Be it known that we, CHRISTIAN L. SCHURR and WM. G. REHBEIN, of the city of Baltimore, in the county of Baltimore, and State of Maryland, have invented certain new and useful Improvements in the Process of Welding Copper; and we do hereby declare that the following is a full and exact description thereof.

This invention consists of a process for welding copper so that there shall be effected as perfect a union between the copper surfaces in contact as is secured in the welding of iron.

Having thus described the nature of our invention, we will now proceed to show in detail how it can be most thoroughly carried into effect.

It is well known that hitherto no one has succeeded in welding copper; hence, pieces of that metal have always been united either by brazing or riveting, methods which are most unsatisfactory, as the joints thus formed are extremely fragile, and yield most readily to to any force applied to them, whether the strain be vertical or longitudinal. It has therefore been from time immemorial a great desideratum to discover a process for welding the metal in question. Many costly experiments have been made to secure the desired end, all of which have heretofore proved abortive.

The cause of failure of these experiments lies in the two following facts: First, heated copper, when exposed to the atmosphere, absorbs oxygen very rapidly—a process commonly known as "scaling"—and the copper thus oxidized will not weld or unite. Second, if the copper be carried to so great a heat as to resist for a time the effects of the oxygen it melts or fuses and becomes, of course, unfit for welding. If copper could be welded *in vacuo* all these difficulties would be overcome; but, this treatment being impracticable, some means must be devised to exclude all oxygen from contact with the heated metal while the weld is being made.

This we claim to accomplish by the following process, viz.: Taking as an example the welding together of the links composing a copper chain. We take the biborate of soda, (borax,) and, heating it until all its water of crystallization is evaporated, pulverize the dry residuum. Having formed a lap-joint between the two ends of the piece of copper designed for a link, the prepared borax is applied between the surfaces, which are then hammered together hot. The joint is then brought to a white heat, powdered over quickly with chloride of magnesium, chloride of sodium, (salt,) or with any of the chlorides or equivalent compounds, which may be deemed most suitable for the purpose of excluding the oxygen, and finally welded. The weld or joint thus effected will be found to be strong, perfect, and durable. Another method by which this weld can be effected is by directing a stream of chlorine gas upon the heated copper during the process of welding.

The action upon the copper of the chlorine, either pure or evolved from the various salts containing it, is readily explained. Being heavier than the atmospheric air, it remains upon or around the heated copper, thus effectually excluding all oxygen, while, as is well known, it greatly increases the heat of the copper immersed within it.

It is needless to dilate upon the great importance and commercial value of this process. By its means copper chains capable of bearing an immense strain can be made and used where iron chains would not answer—on vessels, harbor-buoys, &c.—while the whole art and the manufacture of copper articles and utensils will be revolutionized.

We claim as new and desire to secure by Letters Patent—

1. The use of biborate of soda, or any of its equivalents, together with chlorine gas or the basic salts which contain it, or their equivalents, for the purpose of excluding oxygen from copper while it is being welded.

2. The process above detailed for welding copper.

3. Welded copper chains, articles, and utensils of all kinds, as new articles of manufacture.

CHRISTIAN L. SCHURR.
WILLIAM G. REHBEIN.

Witnesses:
JOHN D. RONSTADT,
CHARLES REHBEIN.